(12) United States Patent
Goldberg

(10) Patent No.: US 12,385,461 B1
(45) Date of Patent: Aug. 12, 2025

(54) COMBINED SYSTEM OF GRAVITATIONAL POTENTIAL ENERGY AND MODULATED BUOYANCY

(71) Applicant: Perry Mark Goldberg, Acton, CA (US)

(72) Inventor: Perry Mark Goldberg, Acton, CA (US)

( * ) Notice: Subject to any disclaimer, the term of this patent is extended or adjusted under 35 U.S.C. 154(b) by 612 days.

(21) Appl. No.: 17/129,831

(22) Filed: Dec. 21, 2020

Related U.S. Application Data

(60) Provisional application No. 62/953,572, filed on Dec. 25, 2019.

(51) Int. Cl.
*F03B 17/04* (2006.01)
*H02K 53/00* (2006.01)

(52) U.S. Cl.
CPC ............. *F03B 17/04* (2013.01); *H02K 53/00* (2013.01)

(58) Field of Classification Search
CPC ................................ F03B 17/04; H02K 53/00
See application file for complete search history.

(56) References Cited

U.S. PATENT DOCUMENTS

| | | | |
|---|---|---|---|
| 4,038,826 A * | 8/1977 | Shaw ......................... | F03G 7/06 60/641 |
| 4,284,899 A * | 8/1981 | Bendiks .................. | F03B 13/06 290/1 R |
| 10,683,851 B2 | 6/2020 | Pedretti et al. | |

\* cited by examiner

*Primary Examiner* — Viet P Nguyen
(74) *Attorney, Agent, or Firm* — Gugliotta & Gugliotta, LPA

(57) ABSTRACT

A system for and method of utilizing phase-change devices at differing elevations to create lighter-than-air substances at the lower elevation to provide efficiencies in lifting objects to the higher elevation and/or to create heavier-than-air substances at the higher elevation to provide efficiencies when lowering objects to the lower elevation.

4 Claims, 5 Drawing Sheets

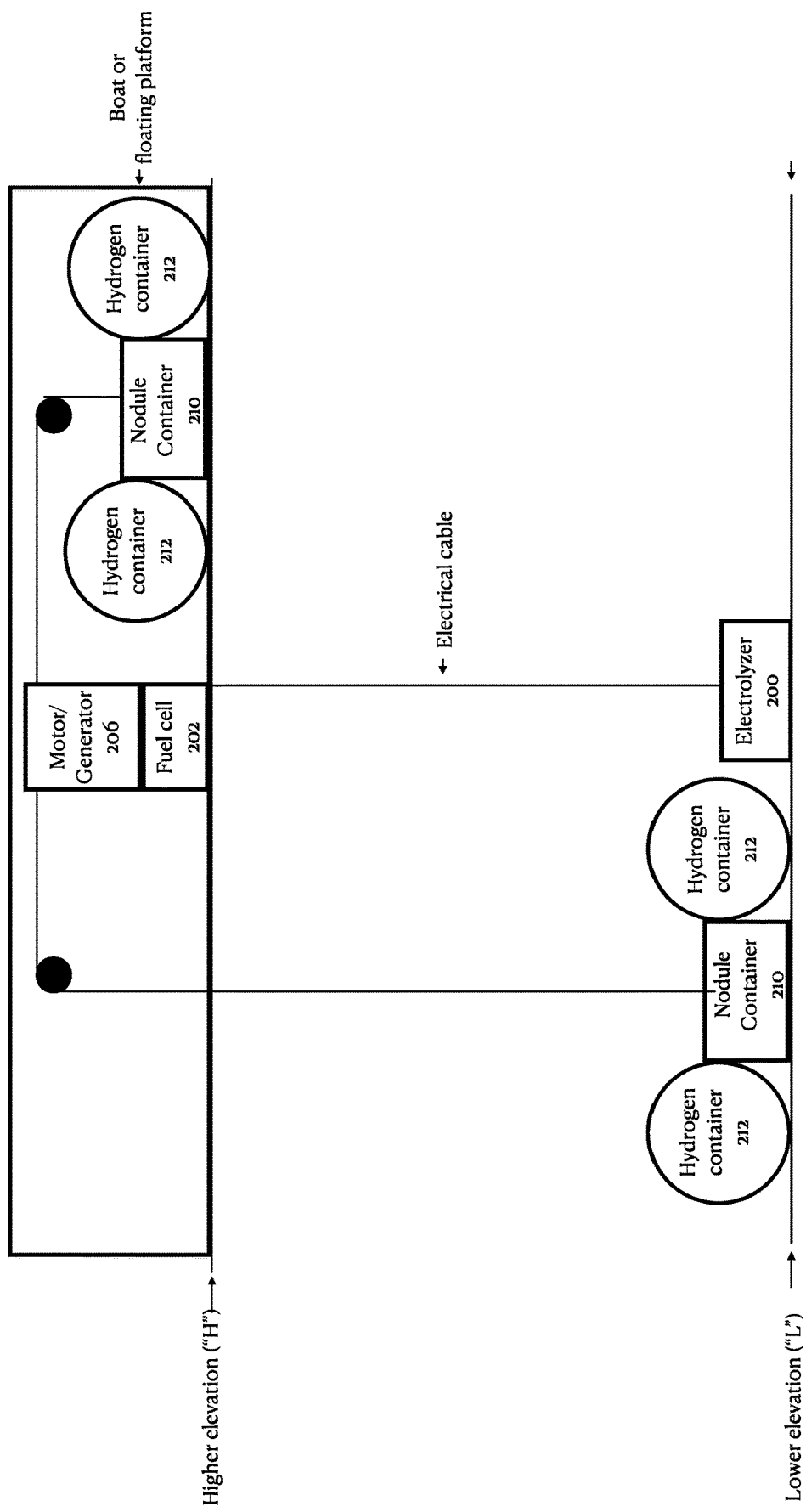

COMBINED SYSTEM OF GRAVITATIONAL POTENTIAL ENERGY AND MODULATED BUOYANCY

RELATED APPLICATIONS

The present invention claims benefit of U.S. Provisional Application Ser. No. 62/953,572 filed on Dec. 25, 2019 and incorporated by reference as if fully rewritten herein.

BACKGROUND OF THE INVENTION

1. Field of the Invention

The present invention relates generally to utilizing phase-change devices at differing elevations to create lighter-than-air substances at the lower elevation to provide efficiencies in lifting objects to the higher elevation and/or to create heavier-than-air substances at the higher elevation to provide efficiencies when lowering objects to the lower elevation.

2. Description of the Related Art

Electrolyzers use electricity to split water into hydrogen and oxygen. Fuel cells reverse the process, combining hydrogen and oxygen to create electricity and water.

A "gravity battery" is a type of energy storage system that stores energy in the form of gravitational potential energy. For example, energy can be used to lift water from a lower elevation to a higher elevation, thus increasing the water's gravitational potential energy. Thereafter the energy stored in the gravity battery can be utilized, for example, by allowing the water to drop to a lower elevation, converting the gravitational potential energy to kinetic energy. The kinetic energy, in turn, can be used, for example, to generate electricity using a turbine and/or to exert a lifting force on other objects utilizing a pulley-type arrangement.

One exemplary commercial implementation for large scale gravity battery systems includes the system implemented by Energy Vault, Inc. of Pasadena, CA, in which an energy storage system includes a crane and a plurality of ballast blocks, where the crane is operable to move blocks from a lower elevation to a higher elevation (where blocks are stacked one on top of the other) to store electrical energy as potential energy of the blocks, and then operable to move blocks from a higher elevation to a lower elevation (via unstacking of the blocks) to generate electricity based on the kinetic energy of the block when lowered (e.g., by gravity). The energy storage system can, for example, store electricity generated from solar power as gravitational potential energy in the stacked blocks during daytime hours when solar power is available, and can convert the gravitational potential energy in the stacked blocks into electricity during nighttime hours when solar energy is not available, and deliver the electricity to the power grid.

Another example of gravity driven power generation is shown in U.S. Pat. No. 4,284,899, in which a power supply generator system includes a fuel cell, an impulse turbine, an electrolyzer and a regulator battery which serve to supply each other and a consumer with energy. The fuel cell combines hydrogen and oxygen to produce electricity and water. The fuel cell is located at a distance above the impulse turbine and the water from the fuel cell falls to activate the turbine which produces energy. The water then flows to the electrolyzer to be separated into hydrogen and oxygen for fuel cell use.

Both types of gravity capture can be economically efficient. However, as described below regarding the present invention, greater efficiencies may be obtained by also utilizing the buoyancy that exists in the hydrogen gas generated by an electrolyzer for lifting objects from lower elevation to higher elevation. Such buoyancy can reduce or eliminate the need to use other energy sources for such lifting.

SUMMARY OF THE INVENTION

It is thus an object of the present invention to utilize phase-change devices at differing elevations to create lighter-than-air substances at the lower elevation to provide efficiencies in lifting objects to the higher elevation and/or to create heavier-than-air substances at the higher elevation to provide efficiencies when lowering objects to the lower elevation.

In one embodiment of the present invention, phase-change devices provide improvements to a gravity battery system. For example, an electrolyzer and a fuel cell can be incorporated into a gravity battery system. The electrolyzer uses electricity, optionally including electricity obtained from the gravity battery system, to split water into hydrogen and oxygen. The hydrogen is then utilized for its lifting force (buoyancy) to aid in increasing the gravitational potential energy of an object that is part of the gravity battery system. At a higher elevation, a fuel cell utilizes the hydrogen in combination with oxygen (whether from the atmosphere or from the electrolysis reaction) to create water and electricity. The water can be utilized as part of the gravity battery's mass containing gravitational potential energy. The gravitational potential energy can be converted to kinetic energy by allowing the water to fall to the lower elevation, where it can be used by the electrolyzer or for other purposes. The electricity generated by the fuel cell likewise can be used by the electrolyzer or for other purposes.

It will be appreciated that the phase-change devices need not be an electrolyzer and fuel cell, and that many other phase-change devices could be used. For example, a boiler could be used at the lower elevation to transform liquid water into steam, and the steam (which is lighter than air) could be the lifting gas. As another example, rather than utilize a fuel cell at the higher elevation wherein the hydrogen is an input for creating water, the Fischer-Tropsch process could use the hydrogen as an input for creating hydrocarbons. Because the lighter-than-air gas (e.g., hydrogen) is able to increase its altitude without the need for any human-supplied energy source, and because the gas also can be used to lift heavier-than-air objects (thereby increasing the gravitational potential energy of those objects), the combination can be used to increase the efficiency of a gravity battery by reducing or even eliminating the amount of energy that otherwise needs to be used to lift the heavier-than-air objects. Moreover, when the lifting gas is combined with other elements or molecules to create heavier-than-air substances such as water or hydrocarbons at an elevated altitude, the heavier-than-air substances also can be incorporated into the gravity battery system on a temporary or permanent basis, further enhancing the efficiency of the gravity battery.

A system according to the present invention may be adapted for use on land, in the air, or under water.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4-5 are a schematic view of the present invention as part of a lifting system exemplary of a preferred embodiment of the present invention underwater.

DESCRIPTION OF THE PREFERRED EMBODIMENTS

It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

For purposes of the present disclosure the terms "a" and "an" herein do not denote a limitation of quantity, but rather denote the presence of at least one (1) of the referenced items. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiments, herein depicted within the Figures.

Figure 1:
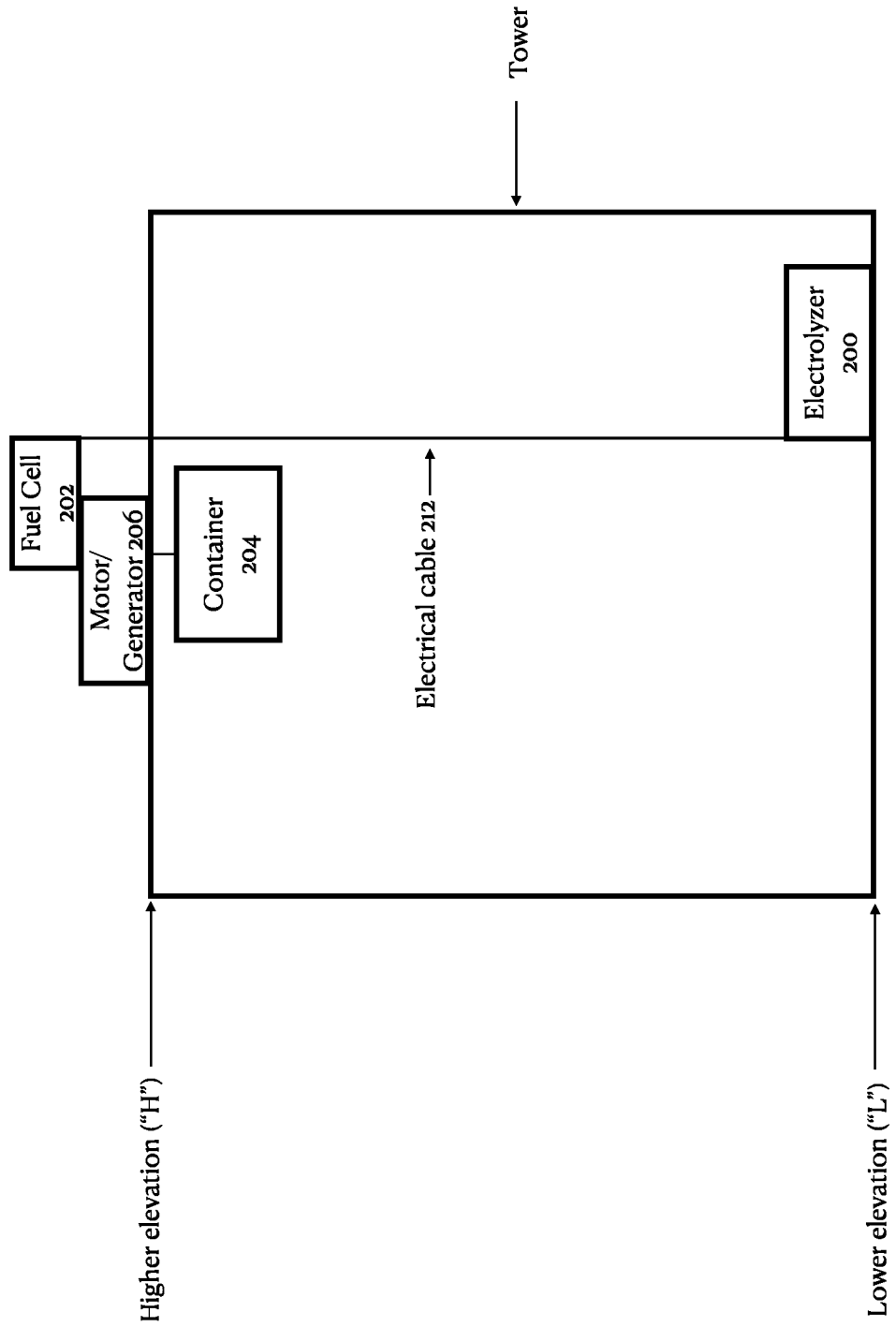
FIGS. 1-3 are schematic views of the present invention as part of an energy storage and retrieval system exemplary of a preferred embodiment of the present invention on land.
Figure 2:
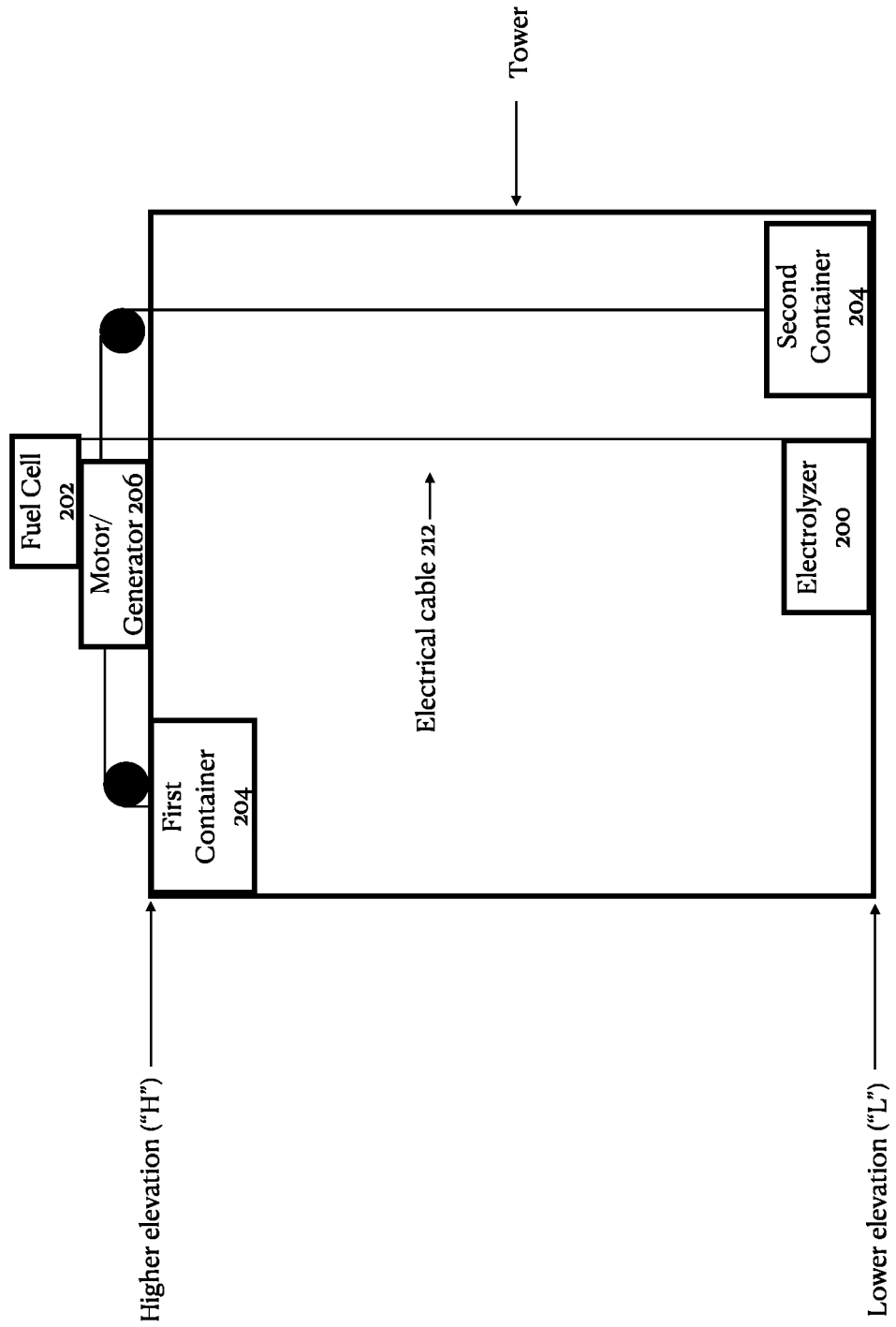
Figure 3:
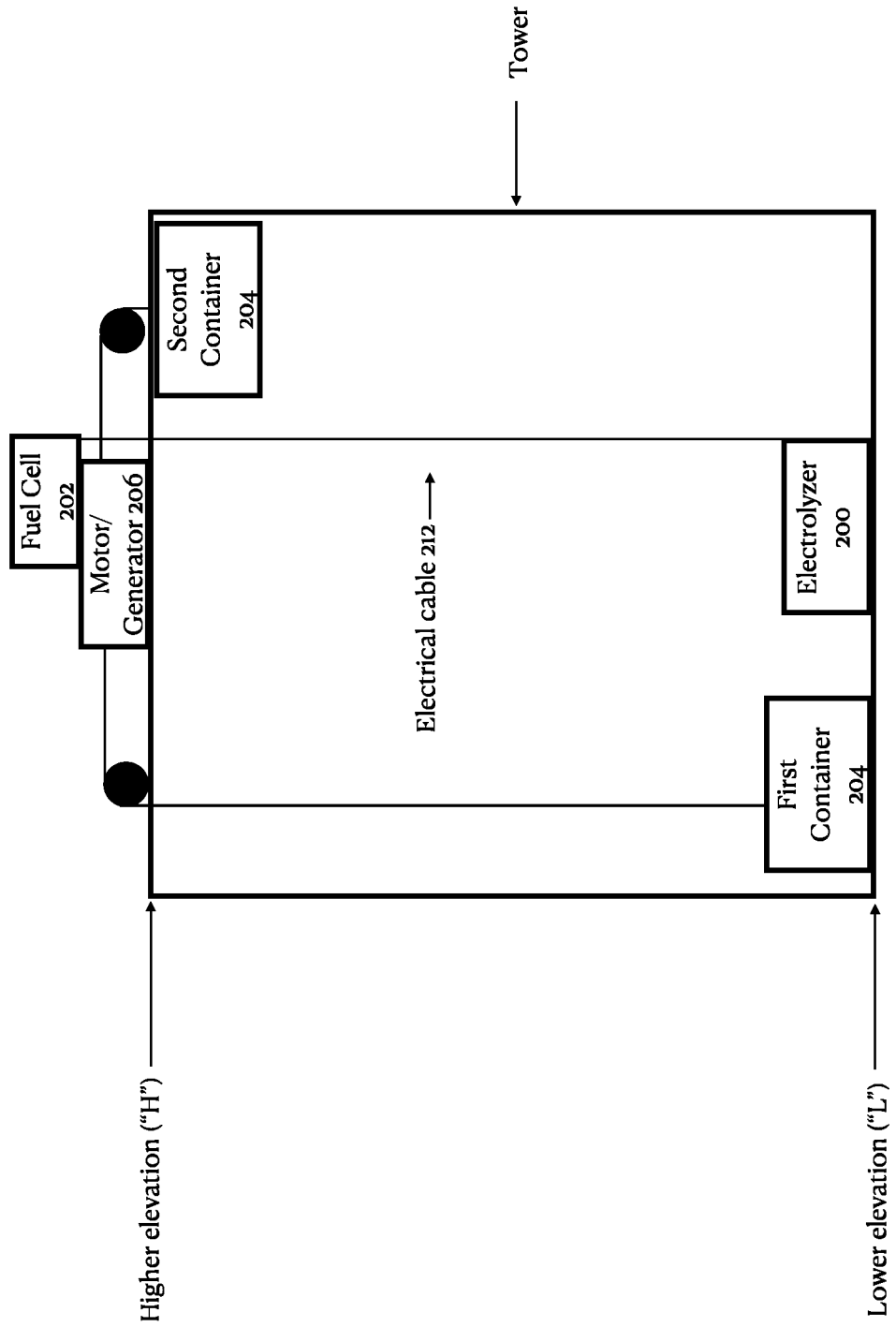

Referring now to the drawings, wherein like reference numerals indicate the same parts throughout the several views, FIGS. 1 through 3 depict the invention as part of an energy storage and retrieval system (the "system"). In the embodiment in FIG. 1, the system utilizes an electrolyzer 200 at a lower elevation (L) (e.g., ground level) where electricity is used to split water into hydrogen and oxygen. The electricity can come from any source, but optimally comes from the fuel cell 202. The water likewise can come from any source, but optimally also comes from the fuel cell 202. The hydrogen generated by the electrolyzer 200 can be stored a container 204 and the lifting force of the hydrogen can aid in lifting the container to a higher elevation (H), such as at the top of a tower. If the lifting force of the hydrogen is not sufficient to lift the container without the addition of external power, a motor/generator 206 can be connected with a cable or other connection device to provide additional lifting power. At the higher elevation (H), the hydrogen gas can be fed from the container 204 into the fuel cell 202 along with oxygen from the electrolyzer or from the atmosphere, creating electricity and water. The water can then be added to the container 204 and allowed to drop back down to the lower elevation (L), the kinetic energy from the falling water and container being captured by the motor/generator 206 and converted into electricity.

In FIGS. 2 and 3, the embodiment shown in FIG. 1 is modified by adding a second container so that the lowering of one container provides additional lifting force for raising the other container.

Figure 4:
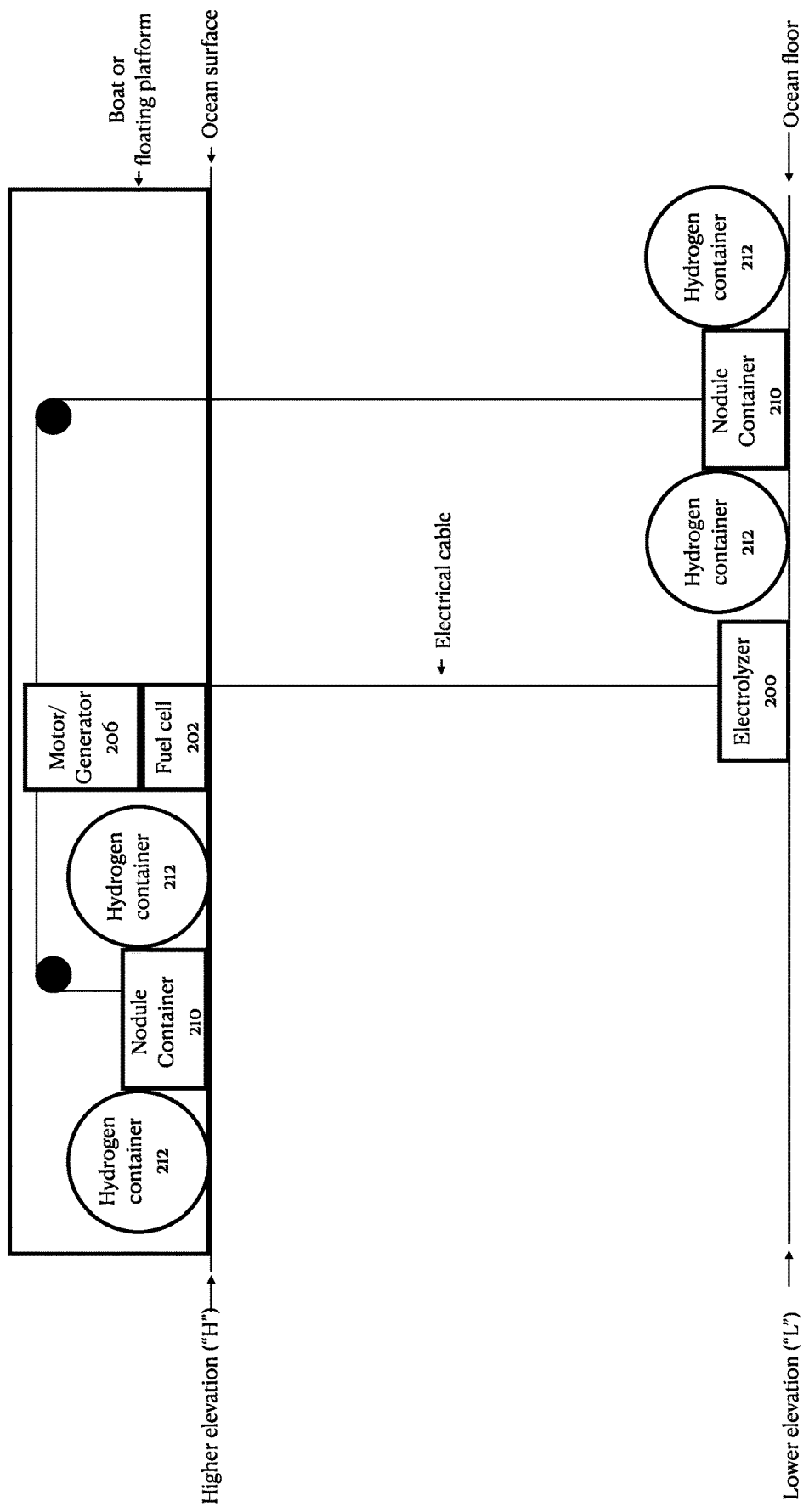

FIGS. 4 and 5 depict the invention as part of a lifting system for raising objects from the sea floor.

An electrolyzer 200 can be positioned at a lower elevation (L) (e.g., the ocean floor). The electrolyzer uses electricity and splits processed sea water into hydrogen and oxygen. The electricity can come from any source, but optimally comes from the fuel cell 202. The hydrogen generated by the electrolyzer 200 can be stored in hydrogen containers 212 attached directly or indirectly to nodule container 210. Nodule container 210 is used for lifting to the ocean surface metallic nodules found at the sea floor. The lifting force of the hydrogen in the hydrogen container(s) 212 can aid in lifting the nodule container 210 to a higher elevation (H) (e.g., the ocean surface). Optionally, empty spaces in the nodule container 210 not filled by nodules can be filled with either hydrogen or oxygen from the electrolyzer 210 to provide additional lifting force. If the lifting force of the gas(es) is not sufficient to lift the nodule container 210 without the addition of external power, a motor/generator 206 can be connected with a cable or other connection device to provide additional lifting power. At the higher elevation (H) (e.g., the surface of the sea), the hydrogen gas can be fed from the hydrogen container(s) 212 into the fuel cell 202 along with oxygen (e.g., from the atmosphere), creating electricity and pure (desalinated) water. The water can then be utilized for drinking or other purposes. The lifted hydrogen container(s) 212 and the lifted nodule containers 210 can then be filled with sea water and lowered back down to the lower elevation (L). The kinetic energy from the descending containers could be captured by motor/generator 206 to provide additional energy to the system.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated.

What is claimed is:

1. A method for storing energy and generating electricity, comprising:
   generating a lighter-than-air gas for storage within or in conjunction with at least one container;
   raising the container from a lower elevation to a higher elevation to store energy in the container, wherein the external energy needed for raising the container is reduced due to the buoyancy of the lighter-than-air gas;
   removing the lighter-than-air gas from the container at or near the higher elevation and using it to create heavier-than-air substances at or near the higher elevation; and
   utilizing the heavier-than-air substances to create electricity by filling the container with the heavier-than-air substances and lowering said container from at or near the higher elevation to a lower elevation and converting the resulting kinetic energy into electricity;
   wherein the generating of the lighter-than-air gas further comprises:
   using a boiler to create steam from liquid water.

2. A method for storing energy and generating electricity, comprising:
   generating a lighter-than-air gas for storage within or in conjunction with at least one container;
   raising the container from a lower elevation to a higher elevation to store energy in the container, wherein the external energy needed for raising the container is reduced due to the buoyancy of the lighter-than-air gas;
   removing the lighter-than-air gas from the container at or near the higher elevation and using it to create heavier-than-air substances at or near the higher elevation; and
   utilizing the heavier-than-air substances to create electricity by filling the container with the heavier-than-air substances and lowering said container from at or near the higher elevation to a lower elevation and converting the resulting kinetic energy into electricity;
   wherein the creating of heavier-than-air substances further comprises:
   using hydrogen to create hydrocarbons.

3. A lifting system comprising in combination:
   an electrolyzer for producing hydrogen gas and oxygen gas by the electrolysis of water, said electrolyzer being located at the sea floor in close proximity to naturally occurring metallic nodules;
   a container for containing hydrogen attached directly or indirectly to a container for containing metallic nodules;
   a fuel cell within which hydrogen gas and oxygen gas are combined to produce water and electrical energy, said fuel cell being located at or near the surface of the sea;
   a motor/generator located at or near the surface of the sea;
   wherein the hydrogen from the electrolyzer can be used to fill the hydrogen container to provide buoyancy for lifting the nodule container;
   and wherein the motor/generator is also attached directly or indirectly to the nodule container and can supply additional lifting force for the nodule container.

4. The lifting system of claim 3, wherein after the hydrogen container and nodule container are emptied of their contents at or near the surface of the sea they can be filled with sea water to make them heavier.

* * * * *